UNITED STATES PATENT OFFICE.

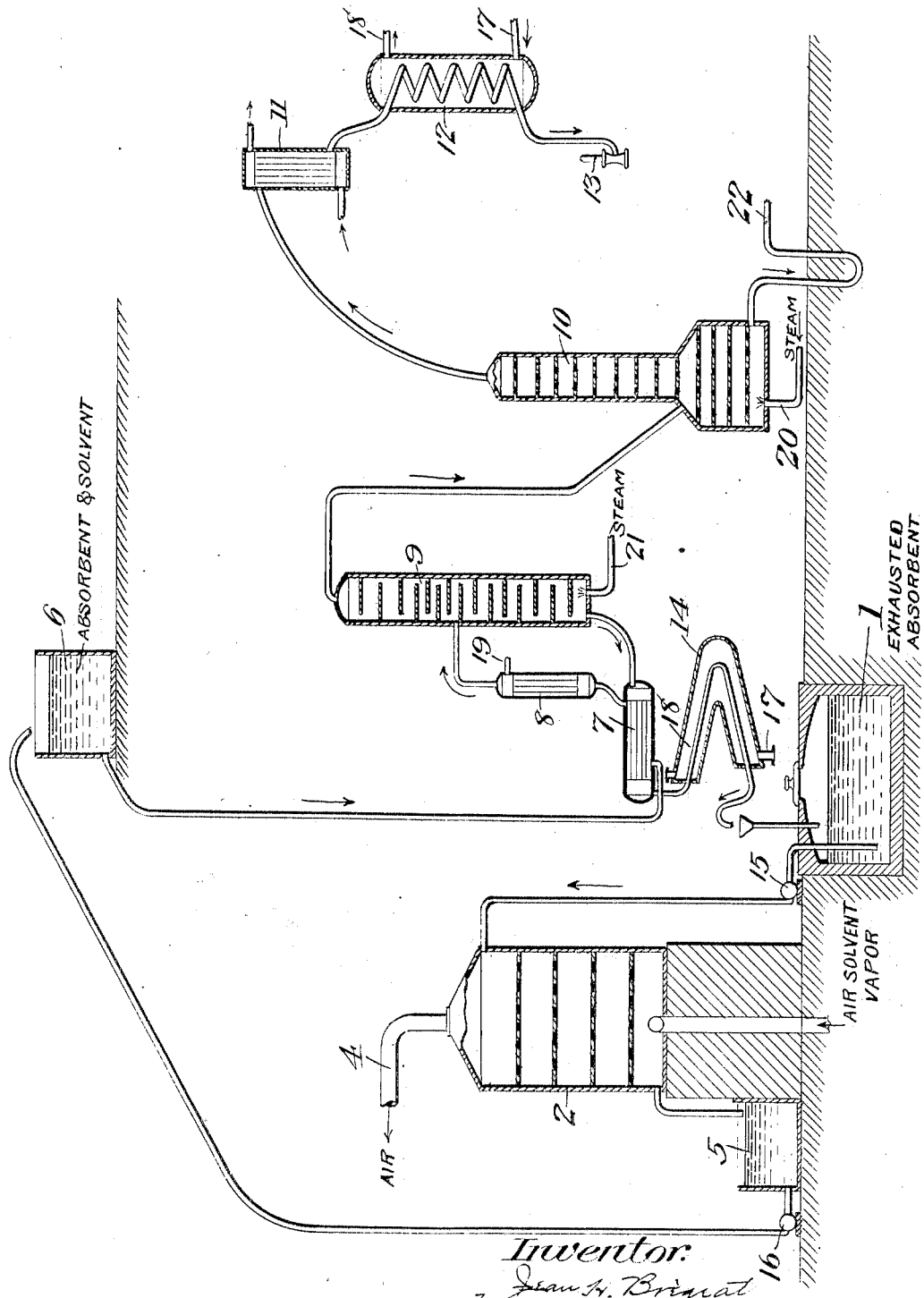

JEAN HENRY BRÈGEAT, OF PARIS, FRANCE.

PROCESS FOR THE RECOVERY OF VOLATILE SOLVENTS.

1,315,700.      Specification of Letters Patent.      Patented Sept. 9, 1919.

Application filed September 4, 1917. Serial No. 189,662.

*To all whom it may concern:*

Be it known that I, JEAN HENRY BRÈGEAT, engineer, of 6 Rue Saint Georges, at Paris, Department of the Seine, France, citizen of the French Republic, have invented certain new and useful Improvements in Processes for the Recovery of Volatile Solvents; and I do hereby declare the following to be a full, clear, and exact description of the invention, such as will enable others skilled in the art to which it appertains to make and use the same.

The present invention has for its object a continuous process for the recovery of volatile solvents actually lost in the course of manufacture, or discharged into the atmosphere in industries using these volatile solvents, of which the principal may be mentioned here: ether, ethyl alcohol, methyl alcohol, amyl alcohol, ethyl acetate, amyl acetate, acetone, carbon bisulfid, carbon tetrachlorid, chloroform, ethylene dichlorid (dielin) ethylene trichlorid (trielin) ethylene perchlorid (etilin) ethane tetrachlorid (tetralin), ethane pentachlorid (pentalin), benzene, toluene, xylene and its homologues, petrolic ether (ligroin, gasolene).

Such solvents are evaporated in large quantities, in various industries in which they are used, during the drying of the materials produced or operated upon in such industries, they being ordinarily vaporized in such a way as to produce a mixture of the vapors with air or other gas. As examples of industries in which such mixtures of solvent with air or gas are produced, the manufacture of artificial silk and smokeless powder, may be mentioned, also the rubber industry.

The present invention is based upon the employment as the absorbent for the solvent vapors, from their admixture with air or other gaseous vehicle, of particular materials referred to below.

The present invention relates to a process for the recovery of the above mentioned solvents satisfying the following conditions, which are necessary in order to enable it to be carried into practice industrially on a large scale.

(*a*) Easy and complete absorption of the solvent, from the air or gas.

(*b*) Convenient recovery of the solvents from the absorbing medium.

(*c*) Non-necessity of previously thoroughly drying the gaseous mixtures containing one or more of the said volatile solvents.

(*d*) Continuous working.

The process, according to the invention, consists in treating the gaseous mixtures, including the volatile solvents which it is desired to recover, with phenolic absorbing agents pure or mixed with any other products of re-agents.

As examples of phenolic agents may be mentioned crude carbolic acid, the residues from the distillation of mixtures of phenol and the cresols, and especially crude cresols of commerce. The said absorbing agents, when brought into contact with the gaseous mixtures containing the volatilized solvents above mentioned, absorb these latter, giving rise to the formation of complex combinations.

These complex combinations are capable of dissociation either by heating or by entraining by steam, from which results the easy liberation of the volatile solvents which are condensed so as to be used again in manufacture.

The phenolic re-agents freed from the volatile solvents are cooled and, being regenerated, reënter the circulation.

The accompanying drawing shows by way of example an arrangement of known apparatus by means of which the process according to the invention can be carried out in practice.

The phenolic re-agent chosen for this example is a mixture formed of crude commercial cresols, which seem to be the most suitable by reason of their low cost and their high absorbing power.

The apparatus for continuous recovery comprises the following essential devices.

A tank for the crude cresols 1; an absorption column with trays 2 in which the circulation of the gaseous mixture charged with one or another or two or several of the volatile solvents above mentioned, entering the apparatus at 3, and leaving it at 4, takes place from the bottom to the top, the flow of the cresols being from the top to the bottom. Two reservoirs 5, 6 for the cresols having dissolved therein one or several of the volatile bodies, a heat-recovery device 7, a steam heater 8, a cascade evaporator 9, a distillation column 10, a condenser 11 for the volatile bodies and the steam, a water-cooling device 12, a gage 13 for the products of condensation from 12, a water-cooling device 14, for the cresols freed from volatile bodies, which cresols after cooling are conducted into the tank 1 for use again, and two pumps 15, 16.

The cooling devices 12 and 14 are fed by a current of cool water, which enters at the bottom of the apparatus at 17, and leaves at the top by the pipe 18.

A suitable steam-generator, not shown in the drawing feeds the steam heater 8 at 19, and serves through 20 and 21 to inject the steam into the distilling column 10 and the evaporator 9.

A suitable fan, not shown in the drawing, causes the gaseous mixture charged with one or another or two or more of the volatile bodies above defined, to enter by the orifice 3, and leave by the orifice 4. These volatile bodies are absorbed by the cresols in the column 2.

For convenience in the description of the operation the processes of absorption, distillation and rectification will be successively described:

*Absorption.*—The principle of absorption is that of a regular counterflow contact. The cresols traverse in the form of a spray the gaseous mixture charged with one, two or several of the volatile bodies and this mixture, flowing in the opposite direction to the cresols, is progressively deprived of the volatile bodies largely diffused therein.

The crude cresols are conducted by any suitable means into the tank 1 and forced by the pump 15 on to the first tray at the top of the column 2. The cresols descend by gravity from tray to tray, from the top to the bottom, the gaseous mixture charged with one, two or several of the volatile bodies flowing from the bottom to the top. At the bottom of the column 2 the cresols charged with volatile substances flow into tank 5 and are lifted by a pump 16, which forces them into the reservoir 6. The gaseous mixtures escape by the orifice 4, completely freed from the substances which were diffused in them.

*Distillation.*—The cresols pass from the reservoir 6 to a heat recovering device 7. They are there heated by means of the heat carried by the cresols, which are hot and deprived of the volatile bodies, leaving the evaporator 9. From the outlet of the device 7, the bodies charged with one, two or several of the volatile bodies pass into a steam heater 8 where they are raised to a temperature such that the volatile bodies alone, or mixtures of them in various proportions, begin to distil.

The cresols pass from the heater 8 into the evaporator 9, where a current of steam entrains the portions of the one, two or several of the volatile bodies which were not vaporized in the heater 8.

*Rectification.*—The volatile bodies and the liberated steam rise mixing together in 9, and are carried to the distilling column 10, then to the condenser. The more volatile product is condensed in 12 and escapes by the meter 13. The less volatile products escape at 22 with the water, and are subsequently separated in suitable distilling columns, not shown in the drawing.

As to the cresols flowing from 9 freed from the volatile bodies which they had absorbed, they are returned to the tank 1 for use again after having been sufficiently cooled in the heat recovering device 7 mentioned above, then in the water-cooling device 14. It will be readily understood that in place of phenolic re-agents any other products or re-agents containing these bodies in suitable proportions can be made use of.

The subject matter of the present application is in large part continued from my copending application 135,849 filed December 8, 1916.

I claim:

1. A process of recovering a volatile solvent from a gas containing the same in vapor form, which comprises passing the gas containing such vapor into contact with a liquid absorbent consisting essentially of phenols, and thereafter separating the absorbed solvent from the absorbent.

2. A process of recovering a volatile solvent from a gas containing the same in vapor form, which comprises passing the gas containing such vapor into contact with a liquid absorbent consisting essentially of cresols, and thereafter separating the absorbed solvent from the absorbent.

3. In the absorption and recovery of volatile solvents, the herein described improvement which comprises bringing the said solvent, in the form of vapor, into contact with an absorbent consisting essentially of phenols.

4. In the absorption and recovery of volatile solvents, the herein described improvement which comprises bringing the said solvent, in the form of a vapor, into contact with an absorbent consisting essentially of crude cresol.

5. The method of recovering vaporized volatile solvents contained in gaseous mixtures, which consists in absorbing said bodies from said mixtures by means of phenols and subsequently separating the said solvent therefrom.

6. The method of recovering ether, alcohol, benzene and acetone contained in gaseous mixtures, which consists in absorbing said bodies from said mixtures by means of cresol and separating said bodies therefrom.

7. The method of recovering ether, alcohol, benzene and acetone contained in gaseous mixtures, which consists in bringing such mixture containing the said substances in the form of vapor, into intimate contact with a phenol containing absorbent for said bodies, separating the larger portion of said bodies from the absorbent by distillation, separating the last traces of the bodies from the absorbent by bringing steam into intimate contact therewith, condensing the vapors, and heating the absorbent containing the ether, alcohol, benzene or acetone before the distillation of the said bodies therefrom by means of the absorbent from which said bodies have been distilled.

8. A process for the recovery of volatile solvents from gaseous mixtures, consisting in treating the mixtures with absorbing agents containing phenolic bodies, extracting the volatile solvents by steam, rectifying the vaporized solvents, and condensing the same.

9. A process for the recovery of volatile solvents from a gaseous mixture, consisting of bringing the gaseous mixtures into intimate contact with absorbing agents having phenolic properties, heating the resulting mixture sufficiently to revaporize the solvent, and condensing the same.

10. A process for the recovery of volatile solvents from a gaseous mixture, consisting in bringing the gaseous mixture into intimate contact with an absorbing agent consisting essentially of a crude phenolic body, heating the resulting mixture, vaporizing the solvent from the last mentioned mixture, the residue being used to heat the incoming mixture containing absorbed solvents and condensing the volatilized solvents.

11. The method of recovering vaporized solvent from a gas containing the same which comprises absorbing the solvent in crude cresol, thereafter distilling the absorbed solvent from the crude cresol, and reusing the crude cresol for absorbing a further amount of solvent.

In testimony whereof I affix my signature, in presence of two witnesses.

JEAN HENRY BRÈGEAT. [L. S.]

Witnesses:
JOSEPH GEMENIL,
EMILE BERTRANOL.